(12) United States Patent
Batey

(10) Patent No.: US 8,302,543 B1
(45) Date of Patent: Nov. 6, 2012

(54) METHOD AND APPARATUS FOR BURNING PARTICULATE MATTER

(76) Inventor: Robert Batey, Mount Pleasant, IA (US)

( * ) Notice: Subject to any disclaimer, the term of this patent is extended or adjusted under 35 U.S.C. 154(b) by 1349 days.

(21) Appl. No.: 11/559,649

(22) Filed: Nov. 14, 2006

(51) Int. Cl.
*F23K 3/00* (2006.01)
*F23L 5/00* (2006.01)

(52) U.S. Cl. ............... 110/101 CD; 110/182.5; 110/102

(58) Field of Classification Search ............ 110/101 CD, 110/102, 283, 262, 173 R, 173 C, 251, 186, 110/188, 199, 200, 201, 205, 254, 298, 314, 110/213, 346, 182.5, 302, 246, 266; 126/117, 126/110 R, 99 R, 112, 77, 76
See application file for complete search history.

(56) References Cited

U.S. PATENT DOCUMENTS

| | | | | |
|---|---|---|---|---|
| 1,472,706 A * | 10/1923 | Weineck | ........................ | 126/112 |
| 2,075,149 A * | 3/1937 | Vodoz | ............................ | 414/161 |
| 2,118,651 A * | 5/1938 | Macchi | ........................ | 250/222.1 |
| 2,125,054 A * | 7/1938 | Stevenson | ..................... | 110/288 |
| 2,242,580 A * | 5/1941 | Foulds | ............................ | 110/190 |
| 2,376,079 A * | 5/1945 | Orphan | ........................ | 200/61.21 |
| 3,108,869 A | 10/1963 | Ellis | | |
| 3,408,167 A * | 10/1968 | Burden, Jr. | ..................... | 422/176 |
| 3,658,017 A | 4/1972 | Dibelius et al. | | |
| 3,792,670 A * | 2/1974 | DiNozzi | ........................ | 110/213 |
| 4,311,102 A * | 1/1982 | Kolze et al. | ..................... | 110/103 |
| 4,312,278 A | 1/1982 | Smith et al. | | |
| 4,334,484 A * | 6/1982 | Payne et al. | ..................... | 110/210 |
| 4,377,117 A * | 3/1983 | Kolze et al. | ..................... | 110/248 |
| 4,454,827 A | 6/1984 | Smith et al. | | |
| 4,457,289 A | 7/1984 | Korenberg | | |
| 4,529,377 A | 7/1985 | Zinn et al. | | |
| 4,531,462 A * | 7/1985 | Payne | ........................... | 110/210 |
| 4,531,509 A * | 7/1985 | Wilhelm, Jr. | ............... | 122/18.31 |
| 4,565,184 A * | 1/1986 | Collins et al. | ................ | 122/16.1 |
| 4,640,458 A * | 2/1987 | Casier et al. | .................... | 237/17 |
| 4,671,192 A | 6/1987 | Hoffert et al. | | |
| 4,712,491 A * | 12/1987 | Schmidt | ........................ | 110/346 |
| 4,782,765 A | 11/1988 | Miller et al. | | |
| 4,836,115 A * | 6/1989 | MacArthur | .................... | 110/234 |
| 4,953,474 A * | 9/1990 | Armitage | ............... | 110/101 CD |
| 4,989,549 A * | 2/1991 | Korenberg | .................... | 122/149 |
| 5,014,631 A | 5/1991 | Ikeda et al. | | |
| 5,303,693 A * | 4/1994 | Schroeter et al. | ............. | 126/522 |
| 5,395,485 A * | 3/1995 | Nashan et al. | ................ | 202/248 |
| 5,678,494 A * | 10/1997 | Ulrich | ........................... | 110/224 |
| 5,766,000 A | 6/1998 | Thompson | | |
| 5,806,441 A * | 9/1998 | Chung | ........................... | 110/185 |
| 6,055,915 A * | 5/2000 | Bickell et al. | ................. | 110/186 |
| 6,145,500 A * | 11/2000 | Westerlund | .................... | 126/101 |
| 6,817,354 B2 * | 11/2004 | Laitinen | ........................... | 126/77 |
| 2006/0107595 A1 | 5/2006 | Davison et al. | | |

* cited by examiner

*Primary Examiner* — Kenneth Rinehart
*Assistant Examiner* — Timothy K Trieu
(74) *Attorney, Agent, or Firm* — Richard C. Emery

(57) ABSTRACT

A steel sided double-walled bottom fed sawdust, woodchip and other particulate matter burning furnace where combustion air is pre-heated by passing around the combustion area between the double walls and further having an automatic fuel shut-off feature.

17 Claims, 2 Drawing Sheets

METHOD AND APPARATUS FOR BURNING PARTICULATE MATTER

FIELD OF THE INVENTION

The present invention generally relates to furnaces.

BACKGROUND OF THE INVENTION

In the past, numerous furnaces have been proposed which have bottom particulate fuel feeding systems. Additionally, furnaces have been proposed which have a pre-heating of the combustion air.

While these furnaces have been used extensively in the past, they do have some drawbacks. These furnaces often are expensive to manufacture.

Consequently, there exists a need for improved methods and apparatus for economically burning particulate matter.

SUMMARY OF THE INVENTION

It is an object of the present invention to provide an apparatus and method for burning particulate matter in an efficient manner.

It is a feature of the present invention to include a bottom fed particulate fuel furnace with an automatic fuel height-limiting mechanism.

It is an advantage of the present invention to economically control the provisioning of fuel into a furnace.

It is another feature of the present invention to include a tangential combustion air pre-heating structure.

It is an advantage of the present invention to achieve improved efficiency in burning solid fuels in a furnace.

The present invention is an apparatus and method for burning solid fuels designed to satisfy the aforementioned needs, provide the previously stated objects, include the above-listed features, and achieve the already articulated advantages.

Accordingly, the present invention is an apparatus and method including a fuel height level limiting mechanism in a bottom fed particulate matter burning furnace, and in another embodiment, a tangential pre-combustion air heating structure.

BRIEF DESCRIPTION OF THE DRAWINGS

The invention may be more fully understood by reading the following description of the preferred embodiments of the invention, in conjunction with the appended drawings wherein.

DETAILED DESCRIPTION

Figure 1:
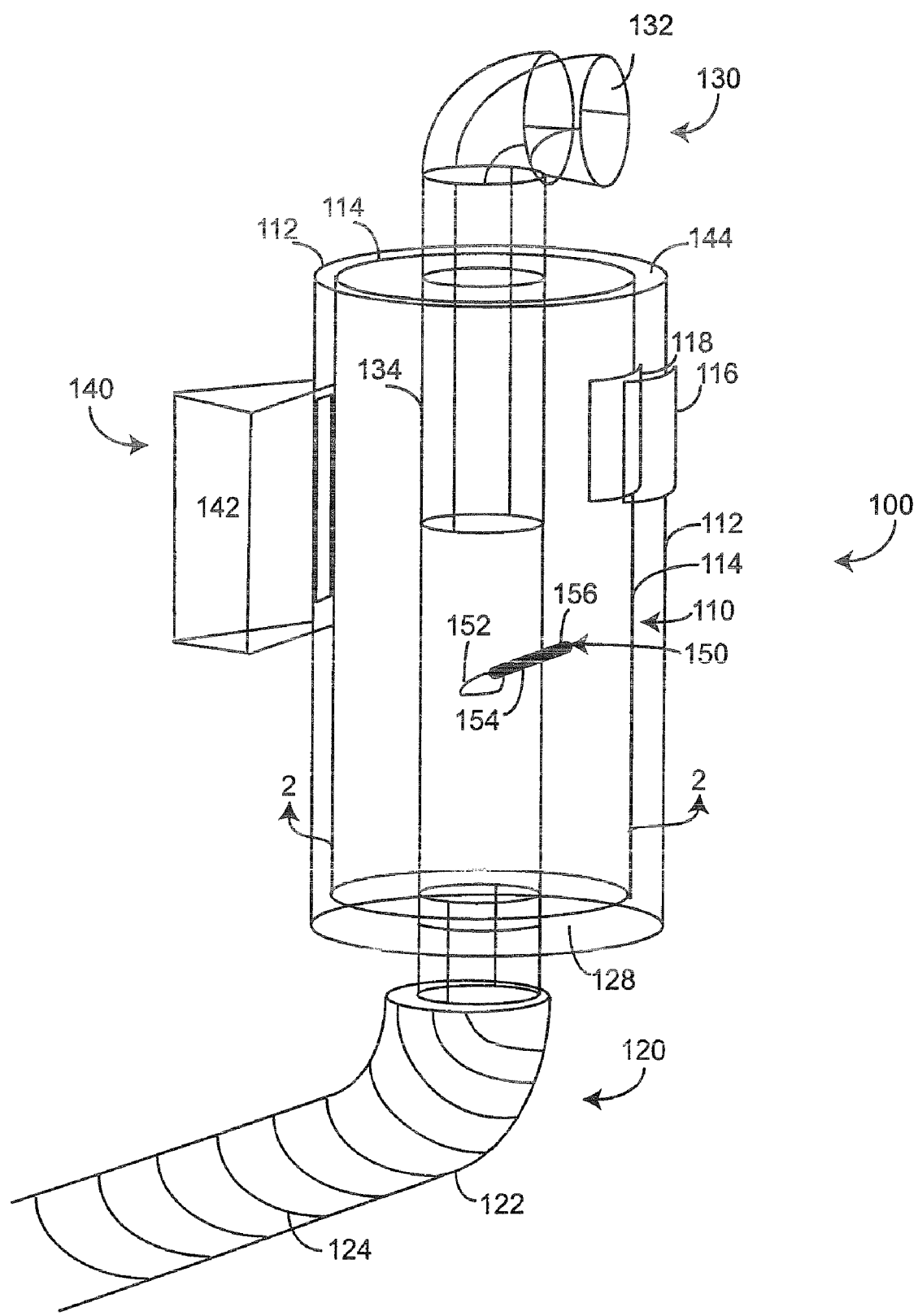
FIG. 1 is a line drawing side view of the furnace of the present invention.
Figure 2:
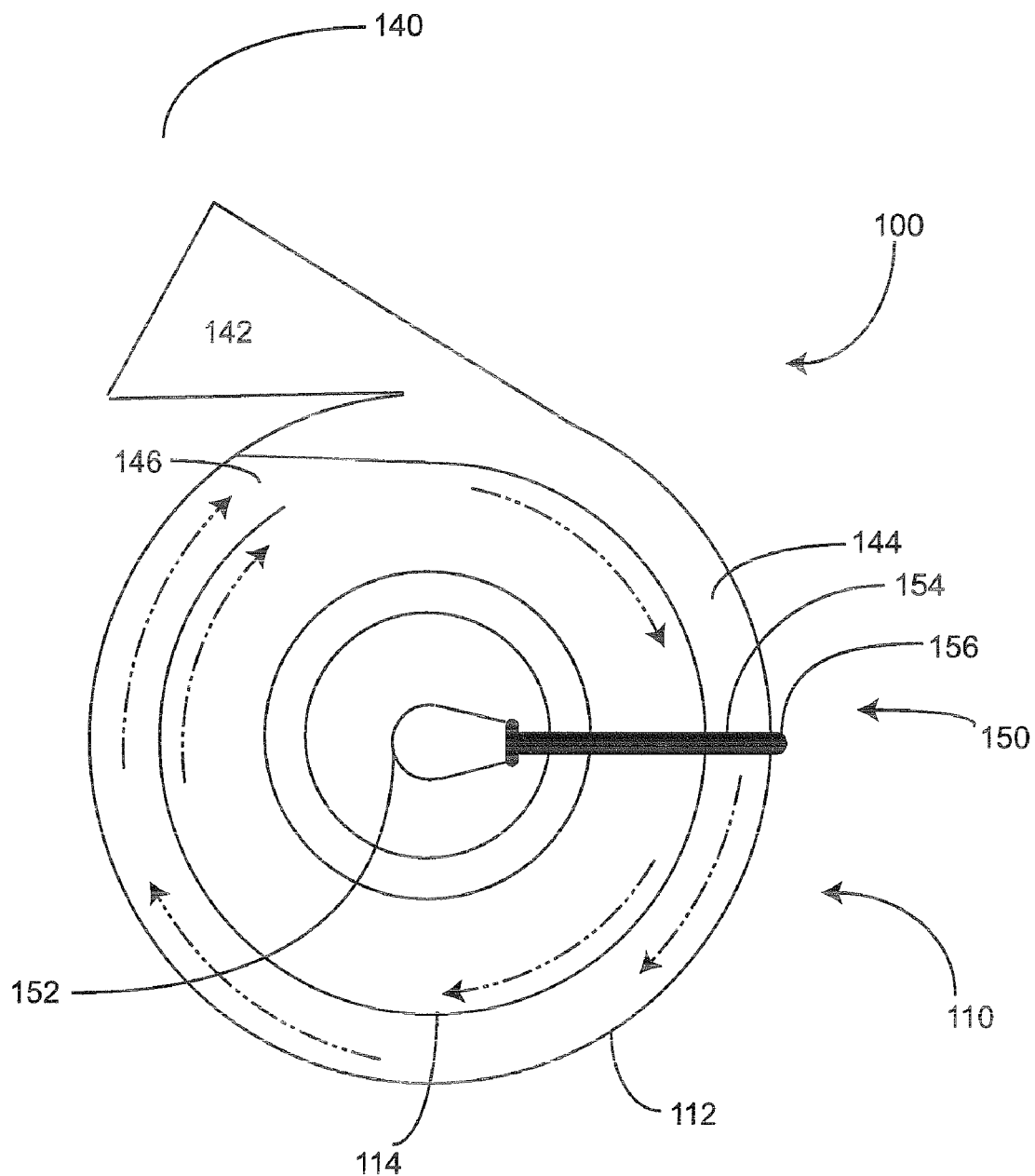
FIG. 2 is a cross-sectional view of the furnace of FIG. 1 taken on line 2-2.

Now referring to the drawings wherein like numerals refer to like matter throughout, and more specifically referring to FIG. 1, there is shown a furnace system, generally designated 100, which includes a furnace main body 110, which has a solid fuel supply mechanism 120, an exhaust system 130, a combustion air intake 140 and a fuel level limit controller 150.

With the furnace main body 110, there can be an outer layer 112 and an inner layer 114, both of which can be made of some metal such as steel, aluminum, iron, copper, or other metallic material. Outer layer 112 and inner layer 114 could also be non-metallic such as concrete, fire brick, ceramic, etc. Furnace main body 110 may include observation doors 116 and 118 which can be a mere hinged or removable segment of the outer layer 112 and inner layer 114 respectively.

Solid fuel supply mechanism 120 includes a supply pipe 122 with an auger 124 therein. Solid fuel supply mechanism 120 could be a conveyor system, pressurized system or any other mechanism for transporting solid matter. The solid fuel supply mechanism 120 provides the fuel into a hole in the bottom 128 of or through an opening (not shown) near the bottom, but in the side of furnace main body 110. In some applications, the fuel feed could be top fed or near top fed.

Exhaust system 130 comprises an outlet port 132 and an internal heat exhaust tube 134 which extends into the furnace main body 110 through a central hole in the top. The materials for exhaust system 130 and heat exhaust tube 134 may be steel or any suitable material which is capable of withstanding the high temperatures produced in the furnace main body 110. The bottom 128 and the top may provide sufficient structural support for maintaining the respective placement of the bottom, top, outer layer and inner layer, exhaust system, and fuel level limit controller. However, internal or additional structural support members may be desirable, depending upon design choices of size, materials, shape, etc.

Combustion air intake 140 is the source of combustion air, and it includes a tapered region 142, as well as a generally cylindrical pre-combustion heating chamber 144 disposed between outer layer 112 and inner layer 114. Air may be forced into tapered region 142 and pass through the chamber 144 where it is heated by the combustion in furnace main body 110. The pre-heated combustion air enters into the central combustion zone of the furnace main body 110 at air inflow region 146 along a substantially tangential line near the inner layer 114. This heated and rotating air enhances combustion of the solid fuel augered into by auger 124.

The solid fuel is augered in until it reaches the desired level, where it engages the inside portion 152 of fuel level limit controller 150. Fuel level limit controller 150 could be a simple lever that is caused to be lifted upward when material strikes the inside portion 152 which transmits the resulting force on intermediate bar 154 to an external free end 156, which could be coupled to a switch or other linkage configured to facilitate switching the auger 124 on and off based upon the fuel height inside of furnace main body 110. Alternatively, other fuel level limiting systems could be employed, including electronic or optical systems.

In operation, the furnace 100 functions as follows: fuel is augered in, filling the central region until engaging the inner portion 152 of fuel level limit controller 150. The operator opens the doors 116 and 118 and throws in some diesel fuel, followed by a match. The diesel fuel and the solid fuel begin to burn, and the exhaust rises and passes up the heat exhaust tube 134 and out an exhaust port 132, where it is used to provide heat for various purposes, such as a boiler, etc. The air is either naturally drawing into the furnace or blown in from a blower. In either case, the air is pre-heated by passing around the tangential air intake port 144 found between the outer layer 112 and the inner layer 114. When the furnace is operating at peak performance, the combustion is intense, and very little fuel is unburned. Any remaining ash is expelled out the exhaust system 130.

Throughout this description, reference is made to a solid fuel or particulate matter furnaces or burning apparatuses, because it is believed that the beneficial aspects of the present invention would be most readily apparent when used in connection with solid fuel and particulate matter furnaces; however, it should be understood that the present invention is not intended to be limited to solid fuel and to particulate matter furnaces, and should be hereby construed to include other types of fuel and other structures that generate heat in a confined area.

Throughout this description, reference may be made to cylinders, circles, centers, etc. because many of the beneficial aspects of the present invention are realized with a furnace with a cylindrical overall shape. However, it should be understood that furnaces with rectangular cross-sections or other shapes may be substituted if they achieve many of the same advantages.

It is thought that the method and apparatus of the present invention will be understood from the foregoing description and that it will be apparent that various changes may be made in the fowl, construct steps and arrangement of the parts and steps thereof, without departing from the spirit and scope of the invention or sacrificing all of their material advantages. The form herein described is merely a preferred exemplary embodiment thereof.

I claim:

1. A furnace for burning wood particles, comprising:
   an outer layer, having a substantially cylindrical shape;
   an inner layer, having a substantially cylindrical shape, disposed inside the outer layer and together forming a substantially cylindrically shaped pre-heating non-combustion and non-exhaust zone for pre-combustion air to pass before entering a combustion zone which is interior of the inner layer, through a longitudinally intermediate side port sized, located and configured to cause pre-combustion air to flow into said combustion zone interior of the inner layer along a line which is substantial tangential to said inner layer and then flow within said combustion zone interior to the inner layer in a substantially circular path;
   a bottom disposed under the inner layer and a top disposed above the inner layer;
   a bottom fed particulate fuel supply means configured to feed particulate fuel through a void in the bottom and further configured to automatically limit a height characteristic of fuel disposed in said combustion zone interior of the inner layer and above the bottom; and
   an exhaust means configured to transport heated air, unburned fuel and ash from inside of to outside of the inner layer, further comprising a centrally disposed heat exhaust tube extending downwardly into a middle section of the interior of the inner layer.

2. A furnace of claim 1 further comprising an opening in the inner layer configured to aiding in lighting fuel within the inner layer.

3. The furnace of claim 2 further comprising an inner door on the opening in the inner layer.

4. The furnace of claim 3 further comprising an outer door on an opening in the outer layer, in registration with the inner door.

5. The furnace of claim 4 wherein the fuel level limit controller comprises a pivoting arm.

6. A furnace of claim 1 wherein the bottom fed particulate fuel supply means comprises an auger in a pipe.

7. A furnace of claim 1 further comprising a blower for forcing air into the interior of the inner layer.

8. The furnace of claim 1 wherein the pre-heating zone extends from the bottom up to a top of the inner layer.

9. The furnace of claim 8 wherein the particulate fuel comprises wood chips.

10. The furnace of claim 1 wherein the outer layer is made of steel.

11. The furnace of claim 10 wherein the inner layer is made of steel.

12. A furnace for burning wood particles, comprising:
    an outer enclosing member having a substantially open interior;
    an inner enclosing member, having a substantially open interior, the inner enclosing member disposed co-axially inside the outer enclosing member and together forming an interior limit and an exterior limit of a non-combustion, non-exhaust, preheating zone for pre-combustion air to pass before entering a combustion chamber interior of the inner enclosing member;
    a bottom fed particulate fuel supply means configured to feed particulate fuel upwardly and further configured to automatically limit a height characteristic of fuel disposed in the combustion chamber;
    an exhaust means configured to transport heated air, unburned fuel and ash from the combustion chamber, further comprising a central disposed heat exhaust tube extending downwardly into a middle section of the interior of the inner enclosing member; and
    wherein said inner enclosing member is configured as a cylinder with a longitudinally intermediate interior air inlet port therein for causing said combustion air to flow in a substantially circular part around, within and adjacent to said inner enclosing member.

13. A furnace of claim 12 wherein the combustion chamber is cylindrical and co-axially disposed within the outer enclosing member.

14. A furnace of claim 12 further comprising a bottom disposed beneath and coupled to said inner enclosing member and said outer enclosing member.

15. A furnace of claim 12 wherein said outer enclosing member is configured as a cylinder and further comprising an exterior air inlet port therein.

16. A furnace of claim 12 wherein said bottom fed particulate fuel supply means is configured to sense a height characteristic of fuel disposed within the combustion chamber and to limit further introduction of fuel into the combustion zone when the height characteristic exceeds a predetermined threshold.

17. A furnace of claim 12 further comprising a means for facilitating air to be blown into the pre-heating zone.

* * * * *